United States Patent [19]

Shibata et al.

[11] Patent Number: 4,914,371
[45] Date of Patent: Apr. 3, 1990

[54] APPARATUS FOR CONTROLLING AC SERVO MOTOR

[75] Inventors: Nobuho Shibata; Takashi Dohi; Kenichi Ohara, all of Osaka, Japan

[73] Assignee: Matsushita Electric Industrial Co., Ltd., Osaka, Japan

[21] Appl. No.: 939,875

[22] Filed: Dec. 9, 1986

[51] Int. Cl.[4] .............................................. H02P 5/40
[52] U.S. Cl. ..................................... 318/723; 318/798
[58] Field of Search ............... 318/798, 806, 811, 722, 318/723; 363/56, 57

[56] References Cited

U.S. PATENT DOCUMENTS

| | | | |
|---|---|---|---|
| 3,387,205 | 6/1968 | Tesdall | 318/434 |
| 3,694,718 | 9/1972 | Graf et al. | 318/811 |
| 3,775,651 | 11/1973 | Graf et al. | 318/802 |
| 4,547,719 | 10/1985 | Sakamoto et al. | 318/723 |
| 4,620,272 | 10/1986 | Fulton et al. | 318/806 |
| 4,672,286 | 6/1987 | Williams | 318/806 |

Primary Examiner—David Smith, Jr.
Attorney, Agent, or Firm—Lowe, Price, LeBlanc, Becker & Shur

[57] ABSTRACT

In apparatus for controlling the rotational speed of a synchronous motor arranged to be driven by an inverter having switches for selectively energizing respective windings of the motor, a current detector is provided to an input of the inverter for detecting input current to the inverter to thereby interrupt energization of the switches by using an output of a first timer circuit when the current exceeds a predetermined value, and a second timer circuit is provided for interrupting energization of the switches on switching between respective phases of the motor. An interrupting time duration by the second timer circuit may be varied in accordance with the rotational speed of the motor and by the plugging state thereof.

5 Claims, 10 Drawing Sheets

APPARATUS FOR CONTROLLING AC SERVO MOTOR

BACKGROUND OF THE INVENTION

This invention relates to apparatus for controlling ac servo motors of synchronous type.

There are several control systems or methods for controlling ac servo motors of synchronous type depending on the usage, and a control system using rectangular wave current is advantageous in view of cost in the case where relatively high accuracy is not required.

FIG. 13 shows a conventional apparatus for controlling an ac servo motor. The apparatus comprises a dc power source 1 and an inverter 2 comprising a plurality of power transistors and a plurality of diodes respectively connected to the transistors in inverse parallel. These transistors of the inverter 2 are controlled by a base drive unit 11. The reference 3 designates a synchronous motor driven by the inverter 2, and the reference 4 designates a rotor position sensor for detecting the rotational position of the rotor (not shown) of the motor 3. The reference 5 is a rotary encoder for detecting the rotational speed of the motor 3. The reference 6 is a speed-to-voltage converter responsive to an output pulse signal indicative of the motor speed from the rotary encoder 5 for converting a speed signal into a voltage. The reference 7 is a speed amplifier for amplifying the difference between a command or setting speed and a detected speed from the speed-to-voltage converter 6. The reference 8 is a current distribution circuit for controlling current distribution using an output signal from the rotor position sensor 4 so that current is distributed to stator windings to be energized. The reference 9 is a multiplier for commanding current distribution of phases U, V and W of the stator windings in accordance with output signals from the current distribution circuit 8. The reference 10 is a combination of a current amplifier and a PWM circuit for flowing command or setting currents in the respective phases through comparison between respective detected currents of the respective phases U, V and W and their command currents. The base drive unit 11 is responsive to the output signals from the combination 10 of the current amplifier and the PWM circuit.

Although the above-described ac servo motor control apparatus is more economical than apparatus performing sinusoidal wave driving, it requires at least two current detectors, where these current detectors are required to isolate dc voltage for current detection. Therefore, the apparatus is generally expensive in cost. Thus, the conventional structure is not suitable for simple servo control apparatus while less cost apparatus is desired.

SUMMARY OF THE INVENTION

The present invention has been developed in order to remove the above-described drawbacks inherent in the conventional ac servo motor control apparatus.

It is, therefore, an object of the present invention to provide a new and useful as servo motor control apparatus which just requires a simplified current detecting circuit and which is of low cost.

According to a feature of the present invention the input current to the inverter is detected for limiting current to the motor. To this end a current detector is provided to an input of the inverter for detecting input current to the inverter to thereby interrupt energization of the switches by using an output of a first timer circuit when the current exceeds a predetermined value. A second timer circuit is also provided for interrupting energization of the switches of the inverter on switching between respective phases of the motor. An interrupting time duration by the second timer circuit may be varied in accordance with the rotational speed of the motor and by the plugging state thereof. Thus, the switches such as power transistors, of the inverter to be turned on subsequently are kept in off state for a given period of time so as to delay the turn on time or all the switches of on state are kept in off state for a given period of time. Since turn on time is delayed or all the switches of on state are kept in off state for a given period of time, excessive current caused from flywheel current, which occurs during switching between switching modes, is prevented from flowing through power transistors used as the switches. As a result of suppression of such excessive current, the above-mentioned system of detecting the input current and limiting the same is now available.

In accordance with the present invention there is provided apparatus for controlling the rotational speed of a synchronous motor; comprising: an inverter having switches for selectively energizing windings of the stator of said synchronous motor, and diodes connected to said switches in inverse parallel, said inverter being responsive to a dc power source; a current detector interposed in a line connected between said dc power source and said inverter; a rotational speed sensing means for producing an output signal indicative of the rotational speed of said synchronous motor; speed setting means responsive to said output signal from said rotational speed sensing means and to a signal indicative of a setting speed; a first timer means responsive to an output signal from said current detector for producing an output signal for a given period of time when a detected current to said inverter exceeds a predetermined value; a pulse width modulation circuit responsive to an output signal from said speed setting means, said pulse width modulation circuit having a sawtooth wave generator and a comparator for outputting outputs through comparison of magnitude between the sawtooth wave from said sawtooth wave generator and an output analog signal from said speed setting means; a gate means responsive to an output signal from said first timer means for gating an output signal from said pulse width modulation circuit for said given period of time determined by said first timer means; a rotor position sensor for producing an output signal indicative of the position of the rotor of said synchronous motor; a distribution circuit responsive to said output signal from said rotor position sensor and to an output signal from said gate means for determining current distribution to said windings of said synchronous motor; a second timer means responsive to an output signal from said distribution circuit for providing an output signal for a given period of time; and a drive circuit responsive to output signals from said distribution circuit and to an output signal from said second timer means for selectively controlling said switches included in said inverter so that said switches are kept in off state for said given period of time determined by said second timer means.

In accordance with the present invention there is also provided apparatus for controlling the rotational speed of a synchronous motor arranged to be driven by an inverter having switches for selectively energizing windings of said synchronous motor, said apparatus having a rotational speed control circuit including a rotational speed sensor and a circuit for comparing a detected speed with a setting speed, said switches being controlled by drive circuitry responsive to said rotational speed control circuit and a rotor position sensor used for selective energization of said windings of respective phases, wherein the improvement comprises: a current detector provided to an input of said inverter; a first timer circuit responsive to an output signal from said current detector for producing a first output signal for a first predetermined period of time which causes said drive circuitry to deenergize said switches for said first predetermined period of time; and a second timer circuit responsive to phase switching in said drive circuitry for producing a second output signal for a second predetermined period of time which causes said drive circuitry to deenergize said switches for said second predetermined period of time.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
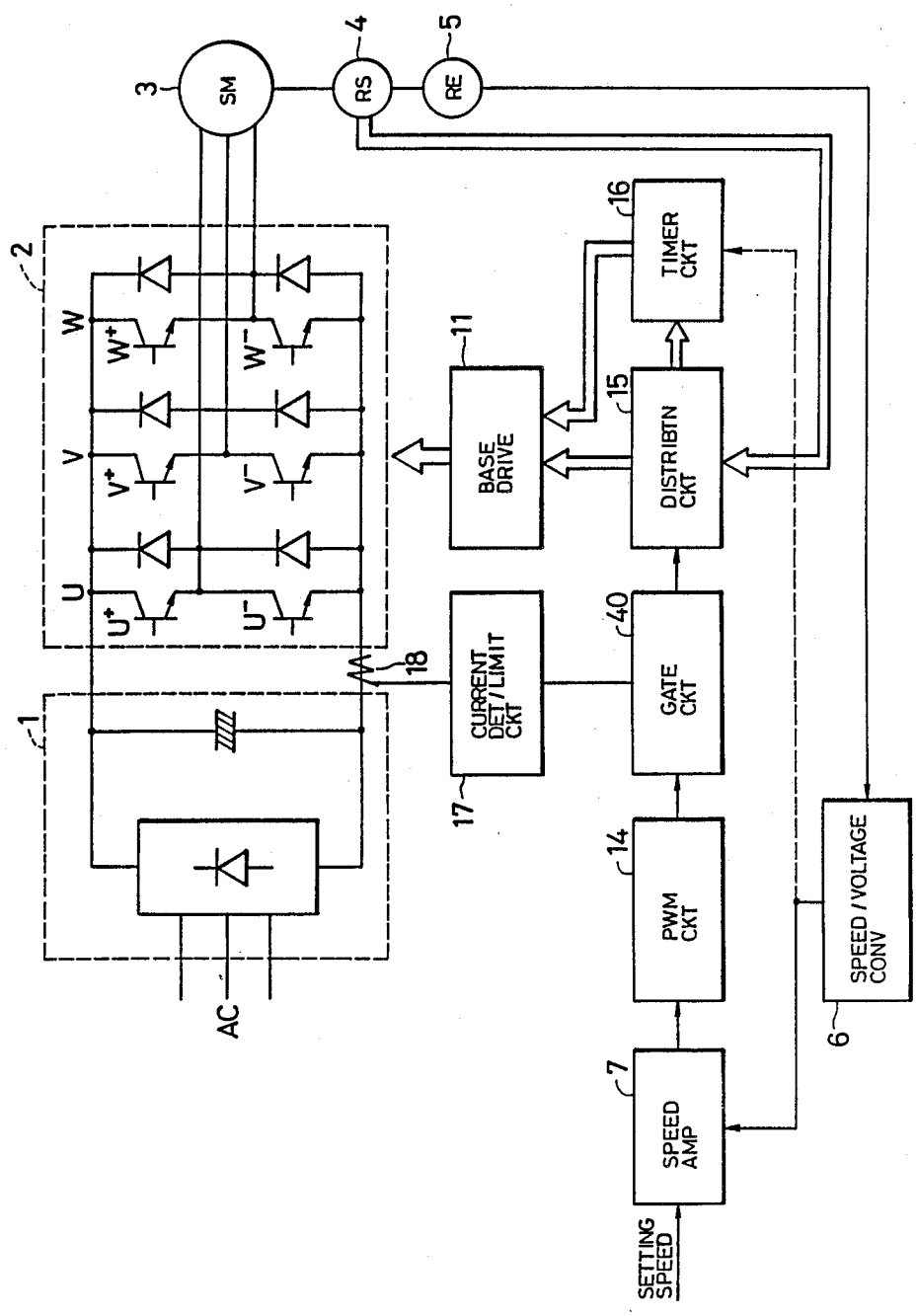
FIG. 1 is a schematic block diagram of a first embodiment apparatus according to the present invention.

Referring now to FIG. 1 of the drawings a first embodiment of the apparatus according to the present invention will be described. The apparatus for controlling an ac servo motor 3 comprises a dc power source 1 an inverter 2, a rotor position sensor 4, a rotary encoder 5, a speed-to-voltage converter 6, a speed amplifier 7, and a base drive circuit 11 which are all substantially the same as those in FIG. 8. The reference 14 is a PWM (pulse width modulation) circuit for controlling voltage to be applied to the motor 3 through pulse width modulation in accordance with an output signal from the speed amplifier 7. The reference 15 is a distribution circuit responsive to output signals from the rotor position sensor 4 and the PWM circuit 14 for controlling power transistors of the inverter 2 to be energized. The reference 16 is a timer circuit for generating outputs for a given period of time at the time of switching in the distribution circuit 15, and for keeping the power transistors, which are to be turned on subsequently, in off state for a given period of time or for keeping all the power transistors in off state for a given period of time.

Figure 2:
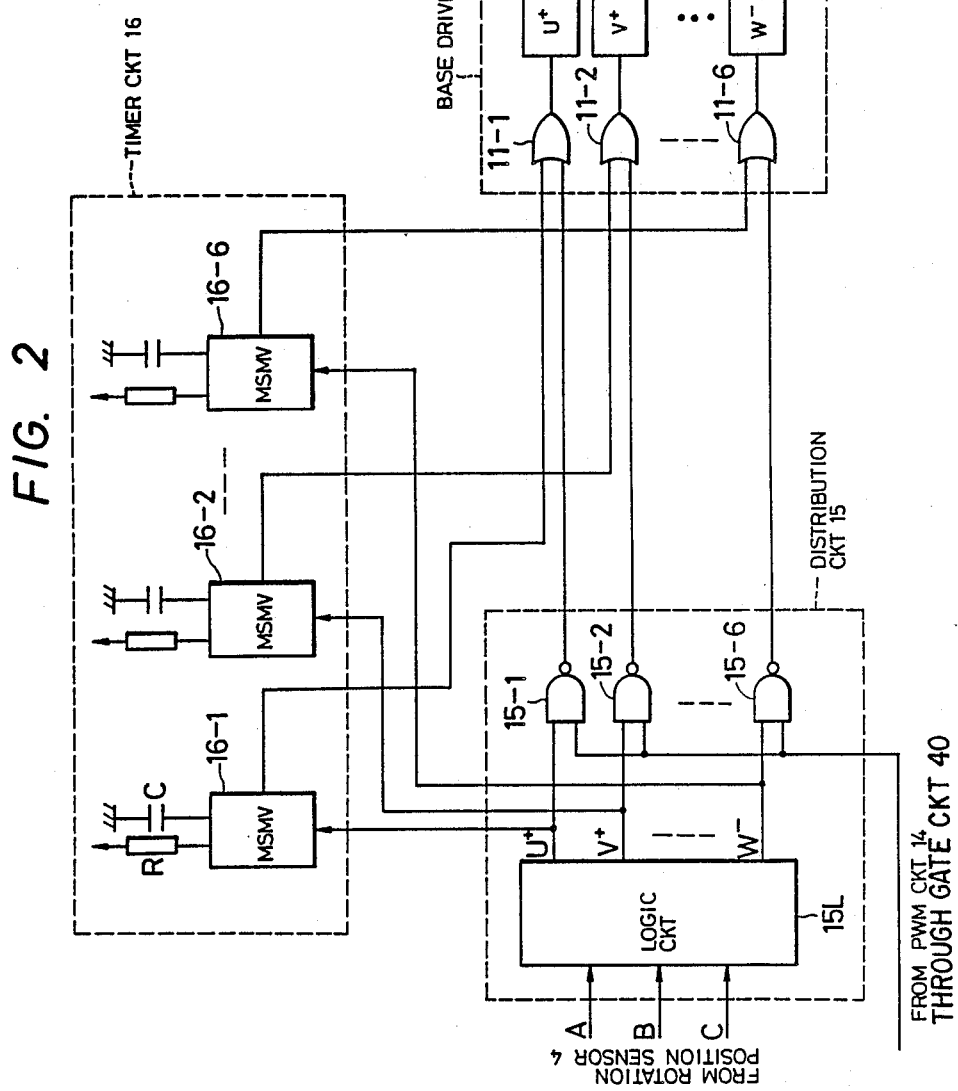
FIG. 2 is a diagram showing detailed structure of the distribution circuit, timer circuit and the base drive unit all shown in FIG. 1.

FIG. 2 shows a detailed unit diagram of the distribution circuit 15, the timer circuit 16, and the base drive circuit 11 all shown in FIG. 1. The distribution circuit 15 comprises a logic circuit 15L responsive to three output signals A, B and C from the rotor position sensor 4 for converting the same into six signals U+, V+, W+, U−, V− and W−, and six NAND gates 15-1 to 15-6 responsive to both these six outputs and an output signal from the PWM circuit 14 of FIG. 1. The timer circuit 16 comprises six monostable multivibrators 16-1 to 16-6 which are arranged to be triggered by the leading edge of the six output signals U+, V+, W+, U−, V− and W− from the logic circuit 15L so that the state of the output signal from each of these monostable multivibrators 16-1 to 16-6 turns high or "H" and this H level state is kept for a given operating period of time $t_d$ determined by the values of a resistor R and a capacitor C associated with each of the monostable multivibrators 16-1 to 16-6. The output signals from the six monostable multivibrators 16-1 to 16-6 and the output signals from the six NAND gates 15-1 to 15-6 are fed respectively to six OR gates 11-1 to 11-6 included in the base drive unit 11. As a result, the output signals from the timer circuit 16 and the output signals from the distribution circuit 15 are respectively ORed by the OR gates 11-1 to 11-6 such that the output signal from the monostable multivibrator 16-1 and the output signal from the NAND gate 15-1 are ORed by the OR gate 11-1. With this arrangement, the timing of the leading edge of the output signal from the distribution circuit 15 can be retarded by the timer operating period of time $t_d$ before it is applied to base drive circuits 11-1B to 11-6B of respective phases in the base drive unit 11. The output signals from the base drive circuits 11-1B to 11-6B are respectively fed to the power transistors of the inverter 2.

Turning back to FIG. 1, the reference 18 is a current detector or sensor for detecting input current to the inverter 2, and the reference 17 is a current detecting and limiting circuit responsive to an output signal from the current detector 18 for detecting the input current to the inverter 2 using the output signal from the current detector 18 and for limiting a peak value of the input current as will be described in detail hereinlater.

Figure 3:
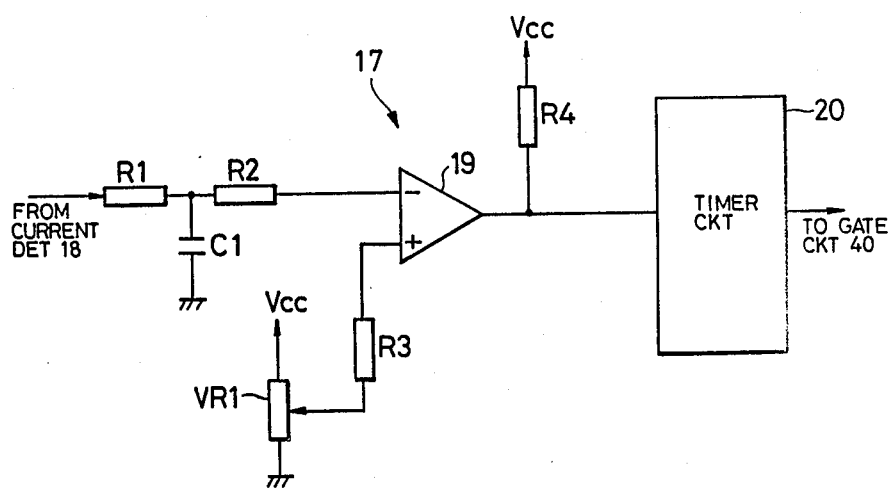
FIG. 3 is a diagram showing a detailed structure of the current detecting and limiting circuit and the gate circuit both shown in FIG. 1.

FIG. 3 shows a circuit diagram of the current detecting and limiting circuit 17 shown in FIG. 1. This circuit comprises a comparator 19, four resistors R1 to R4, a variable resistor VR1, a capacitor C1, and a timer circuit 20. The output signal from the current detector 18 is fed via a series circuit of the two resistors R1 and R2 to an inverting input terminal (−) of the comparator 19, while a noninverting input terminal (+) of the same is connected via the resistor R3 to a movable contact of the variable resistor VR1 interposed between a given dc voltage source Vcc and ground. The resistor R4 is interposed between a given dc voltage source Vcc and the output terminal of the comparator 19. With this arrangement, when detected current to the inverter 2 becomes larger than a preset value determined by the variable resistor VR1, the output signal from the comparator 19 turns to low or "L" which is fed to the timer circuit 20. This timer circuit 20 is provided for interrupting the energization of the power transistors of the inverter 2 which are in on state. In other words, on state power transistors are turned off for a given period of time, i.e the operating time of the timer circuit 20, so as to reduce current to the motor 3. When these power transistors are turned on again to increase the motor current to be above a limit value, then the above-mentioned operation is repeated. As a result the motor current is controlled to have ripple and thus the peak value thereof is limited. The timer circuit 20 may be a monostable multivibrator, and its output is fed to a gate circuit 40 through which an output signal from the PWM circuit 14 is fed to the distribution circuit 15.

Figure 4:
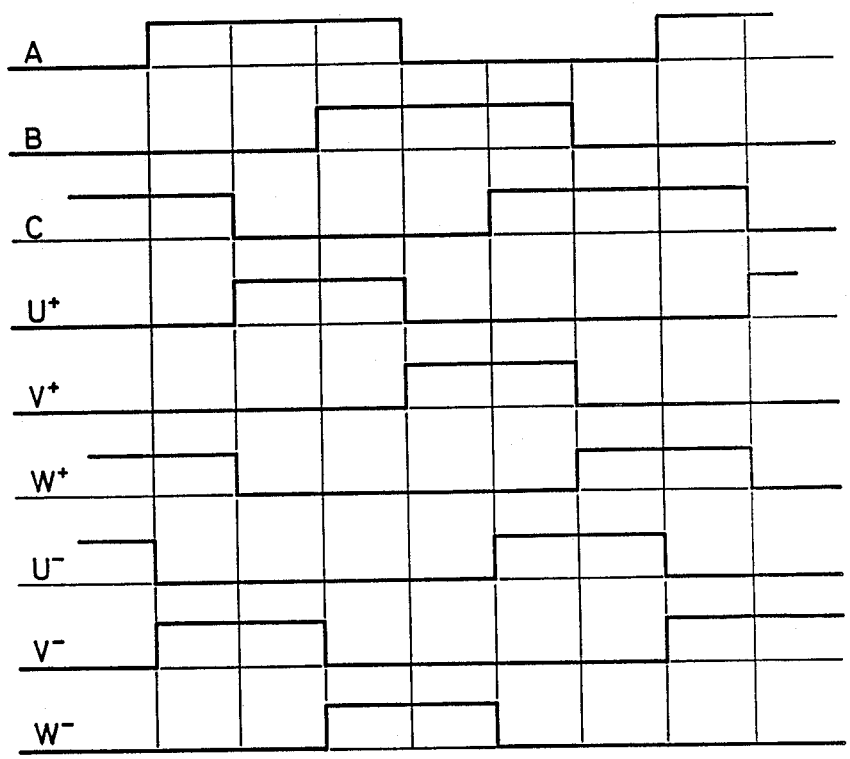
FIG. 4 is a timing chart showing the operation of the distribution circuit shown in FIG. 1.

FIG. 4 is a switching timing chart of the power transistors of the inverter 2 where the switching is based on the output signals from the rotor position sensor 4. In this timing chart, the references A, B and C designate three output signals from the rotor position sensor 4, which signals are of three phase outputs having phase difference of 120° therebetween. The references $U^+$, $V^+$, $W^+$, $U^-$, $V^-$ and $W^-$ are waveforms of the output signals from the base drive unit 11 which are respectively fed to the associated power transistors of the same references. It is to be noted that the waveforms $U^+$ to $W^-$ are shown without being modulated by the output signal from the gate circuit 40. In other words, the waveforms $U^+$ to $W^-$, which are not shortened or reduced by output signal from the gate circuit 40, are shown in FIG. 4, but actually the illustrated waveform is shortened or interrupted when an output pulse signal is fed from the gate circuit 40 for controlling the rotational speed to a setting speed and for controlling the energization of the motor 3 by detecting current to said inverter 2.

Figure 5B:
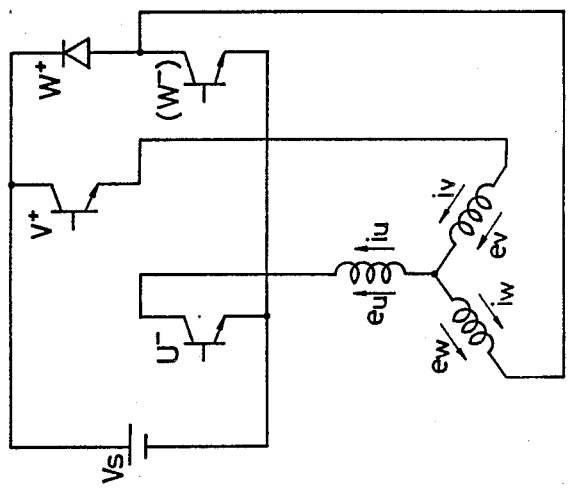
FIGS. 5A and 5B are equivalent circuits of driving state and plugging state respectively.
Figure 5A:
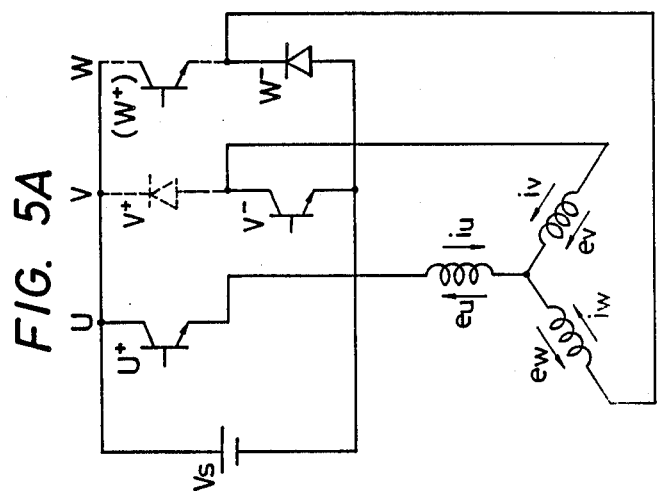

Let us consider a switching state from mode I to mode II of the energization of the power transistors. FIGS. 5A and 5B are equivalent circuit diagrams of a driving state and a plugging or counter-current braking state respectively. More specifically, in FIG. 5A showing the driving state, the power transistors $W^+$ and $V^-$ are in on state in mode I, and when the mode is switched to mode II, current $i_w$ through the winding is to be switched to $i_u$, where $i_w$ continues to flow for a given period of time as a flywheel current from a diode of the power transistor $W^-$ to the power transistor $V^-$. FIG. 5B shows a case of plugging and the circuit shown there just differs from that of FIG. 5A in that power transistors of opposite polarity are in on state and the relationship between the induced voltages and currents is reversed.

Figure 6A:
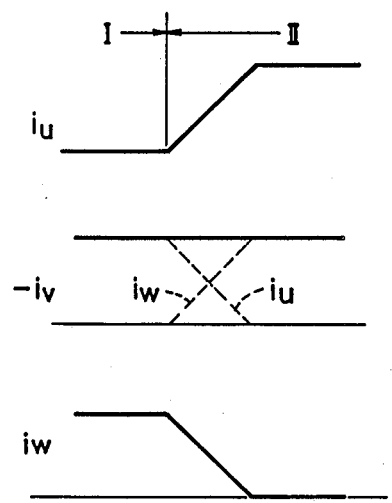
FIGS. 6A and 6B are diagrams showing the variation in respective phase currents on phase switching.
Figure 6B:
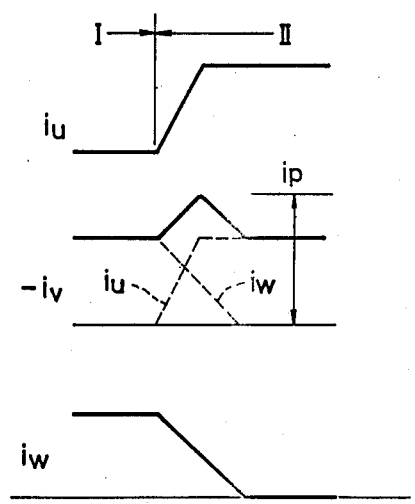

FIGS. 6A and 6B show current switching states. In FIG. 6A, $i_w$ is turned off to start dropping and simultaneously $i_u$ is turned on to start rising. When the variation rates of these two currents $i_w$ and $i_u$ are substantially equal to each other, the current $-i_v$ of phase V assumes a substantially constant value as the sum of $i_u$ and $i_w$. FIG. 6B shows a case where $i_u$ rises up quicker than the dropping of $i_w$. In this case, a peak current flows in the phase V as the sum of $i_u$ and $i_w$. This peak current has a chance to assume a value which is 1.5 times the limit value of $i_u$ and $i_w$. Therefore, it is necessary to increase the current capacity of the power transistors.

Figure 7A:
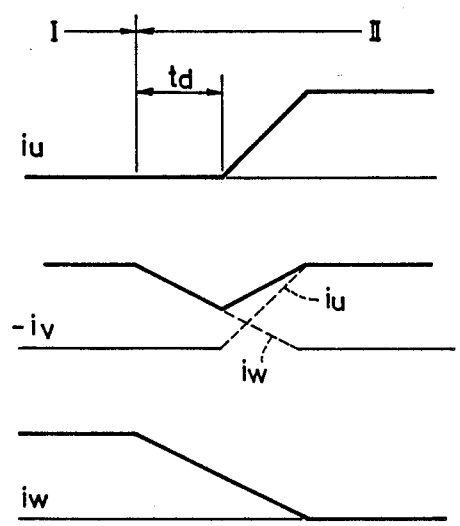
FIGS. 7A and 7B are explanatory diagrams for describing how peak current is reduced in the present invention.
Figure 7B:
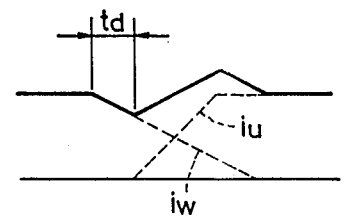

The above-mentioned peak value can be reduced by the provision of the timer circuit 16 shown in FIG. 1, and it will be described how this is achieved with reference to FIG. 7A. In FIG. 7A, the reference $t_d$ is a duration for which the power transistor $U^+$ is in off stage by the operation of the timer circuit 16. In this period $t_d$, $i_w$ decreases and then $i_u$ increases after the end of the duration $t_d$. As a result, the sum of $i_u$ and $i_w$ varies as shown, that is first dropping and then rising. Therefore, no peak current such as shown in FIG. 6B occurs. FIG. 7B shows a case where the duration $t_d$ is smaller than the case of FIG. 7A. In this case, although the amount of dropping of $i_v$ in the duration td is smaller than in the case of FIG. 7A, a slight peak current occurs.

Figure 8:
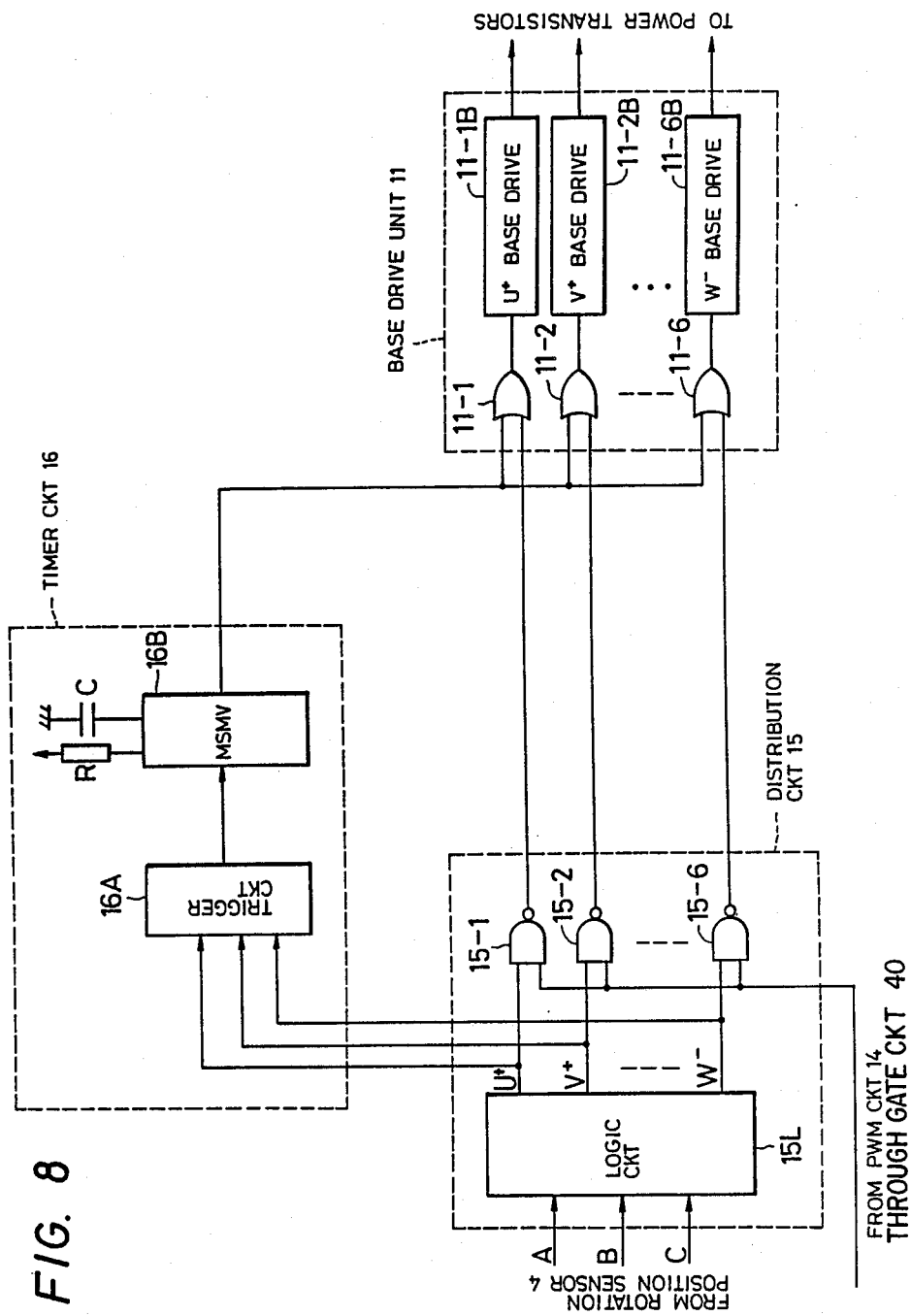
FIG. 8 is a diagram partially showing a second embodiment apparatus according to the present invention.

Reference is now made to FIG. 8 showing a second embodiment apparatus according to the present invention. The second embodiment differs from the first embodiment in that a set of a trigger circuit 16A and a single monostable multivibrator 16B is used in place of the six monostable multivibrators 16-1 to 16-6 of FIG. 2. The trigger circuit 16A is arranged to be responsive to any one of the six outputs $U^+$, $V^+$ ... $W^-$ from the logic circuit 15L such that the monostable multivibrator 16B is triggered by the leading edge of any one of these six outputs. The monostable multivibrator 16B produces "H" level output for a given period of time $t_{off}$ so that all the base drive circuits 11-1B to 11-6B are put in off stage for the period of time td by obtaining logical OR in connection with $U^+$ to $W^-$.

Figure 9:
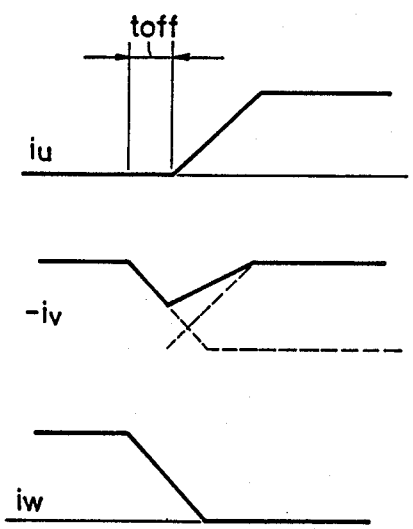
FIG. 9 is a diagram for describing the operation of the second embodiment of FIG. 8.
Figure 13:
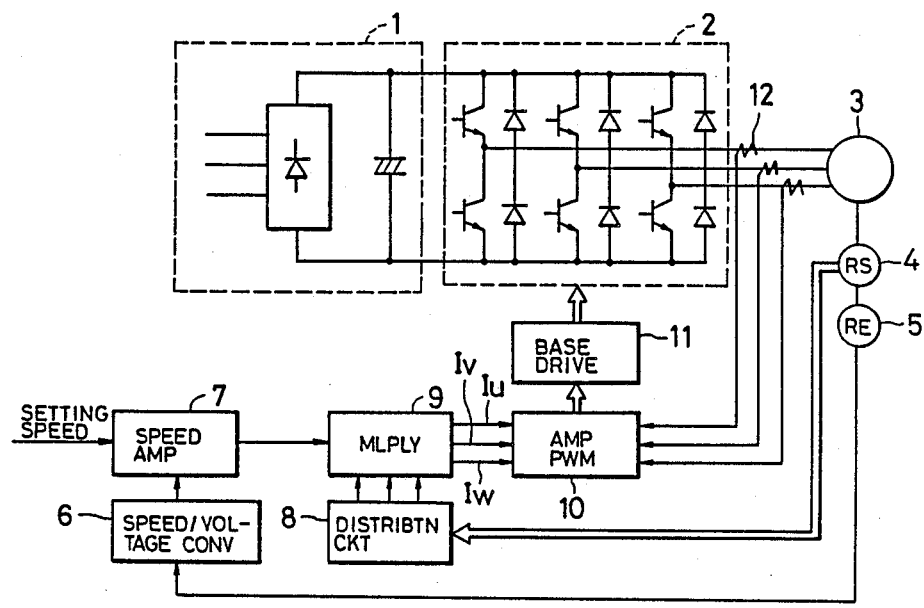
FIG. 13 is a block diagram showing a conventional motor control apparatus.

The operation of the second embodiment will be described with reference to a timing chart of FIG. 9. In FIG. 9, the reference $t_{off}$ indicates a period of time for which all the power transistors of the inverter 2 are kept in off state by the timer circuit 16. The provision of off time indicated by $t_{off}$ at the switching timing results in turning off of the power transistor $V^-$ simultaneously, and thus $i_w$ returns to power source to circulate via the diode $V^+$ shown by dotted lines in FIG. 5A. As a result, the dropping time period for $i_w$ is drastically shortened and thus, it is possible to shorten $t_{off}$.

Figure 10:
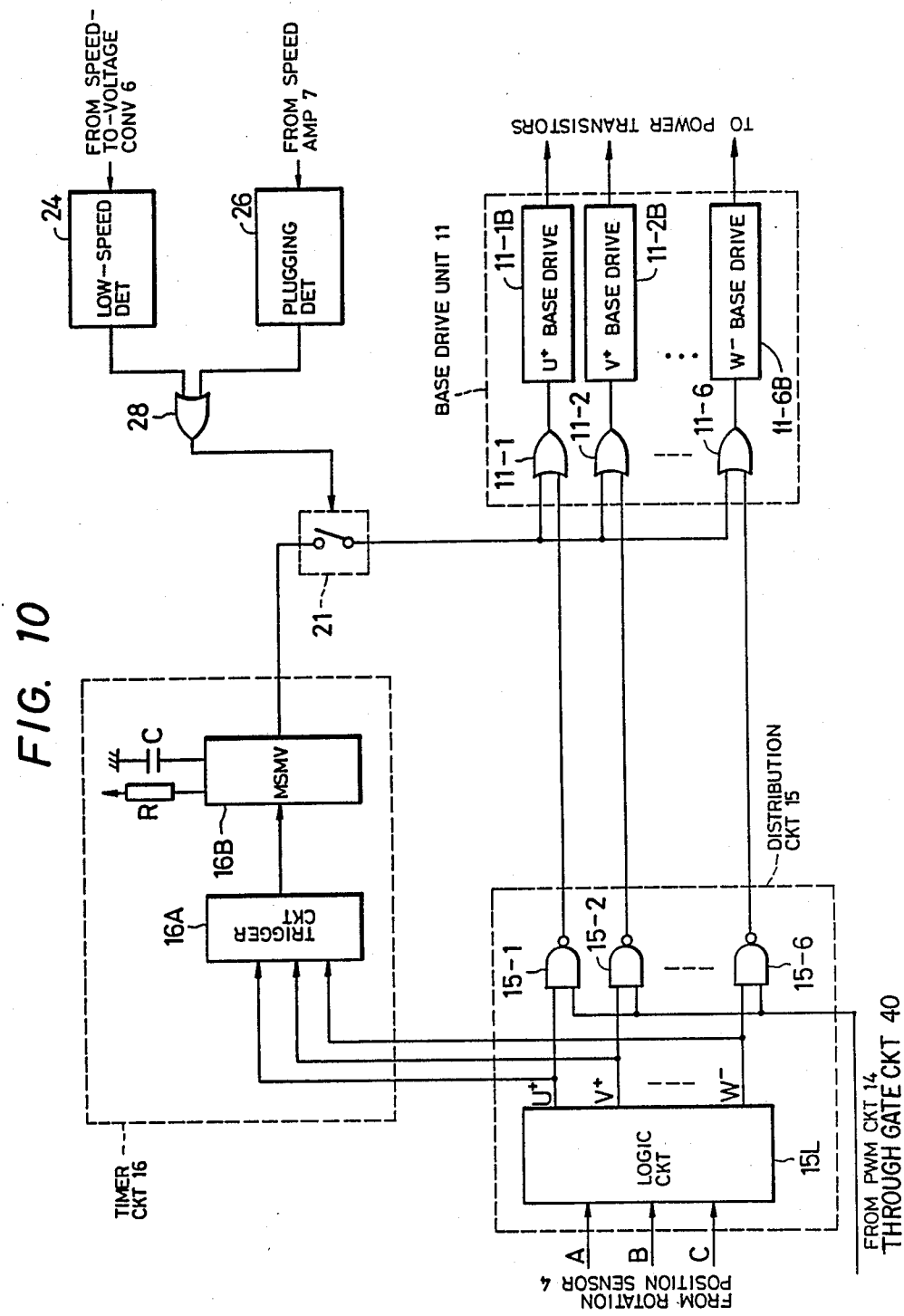
FIG. 10 is a diagram partially showing a third embodiment apparatus according to the present invention.

Reference is now made to FIG. 10 showing a third embodiment apparatus according to te present invention. The third embodiment differs from the above-described second embodiment of FIG. 8 in that a switch 21 is provided to an output line of the monostable multivibrator 16B. This switch may be a semiconductor switch which is controlled by the output signal from the speed-to-voltage converter 6 and the output signal from the speed amplifier 7. With the provision of the switch 21 which opens and closes in accordance with the above-mentioned two signals, the output signal from the monostable multivibrator 16B is selectively applied to the OR gates 11-1 to 11-6 of the base drive unit 11.

As shown in FIG. 10, the output signal from the speed-to-voltage converter 6 is fed to a low-speed detector 24, while the output signal from the speed amplifier 7 is fed to a plugging detector 26. Output signals from the low-speed detector 25 and the plugging detector 26 are fed to an OR gate 28 whose output signal is fed to the switch 21 as a switching control signal. The low-speed detector 25 and the plugging detector 26 may be comparators. More specifically, the low-speed detector 24 is arranged to produce "H" level output when the output voltage from the speed-to-voltage converter 6 is below a predetermined value to detect that the motor 3 rotates at a speed below a predetermined speed. Similarly, plugging or counter current braking state is detected by the plugging detector 26 by detecting that the output signal from the speed amplifier 7 is positive because such a positive output signal indicates that the motor speed is more than commanded speed to be in braking state. In either of these cases, the switch 21 is turned on to supply the OR gates 11-1 to 11-6 with the output signal from the monostable multivibrator 16B to turn off the power transistors of the inverter for $t_{off}$.

The third embodiment of FIG. 10 is provided for the following reason. Considering the rising time or rate of $i_u$ shown in FIG. 9, this current $i_u$ rises on the basis of the difference between power source voltage and induced voltage as will be understood from FIG. 5A. Therefore, rising time is short when the motor speed is low. On the other hand, during plugging $i_u$ rises on the basis of the sum of the power source voltage and the induced voltage as will be understood FIG. 5B. Therefore, rise time is short in the entire operating range from low speed to high speed. Summarizing the above, the aforementioned peak current caused from the short rise time of $i_u$ occurs during low speed driving of the motor and during the entire range of plugging. In other words, the output signal from the monostable multivibrator 16B is needed only in the above-mentioned states. To this end, the switch 21 is controlled to supply the output signal from the monostable multivibrator 16B only when necessary. Thus, undesirable torque reduction caused from reduced current due to unnecessary off time is prevented.

Figure 11:
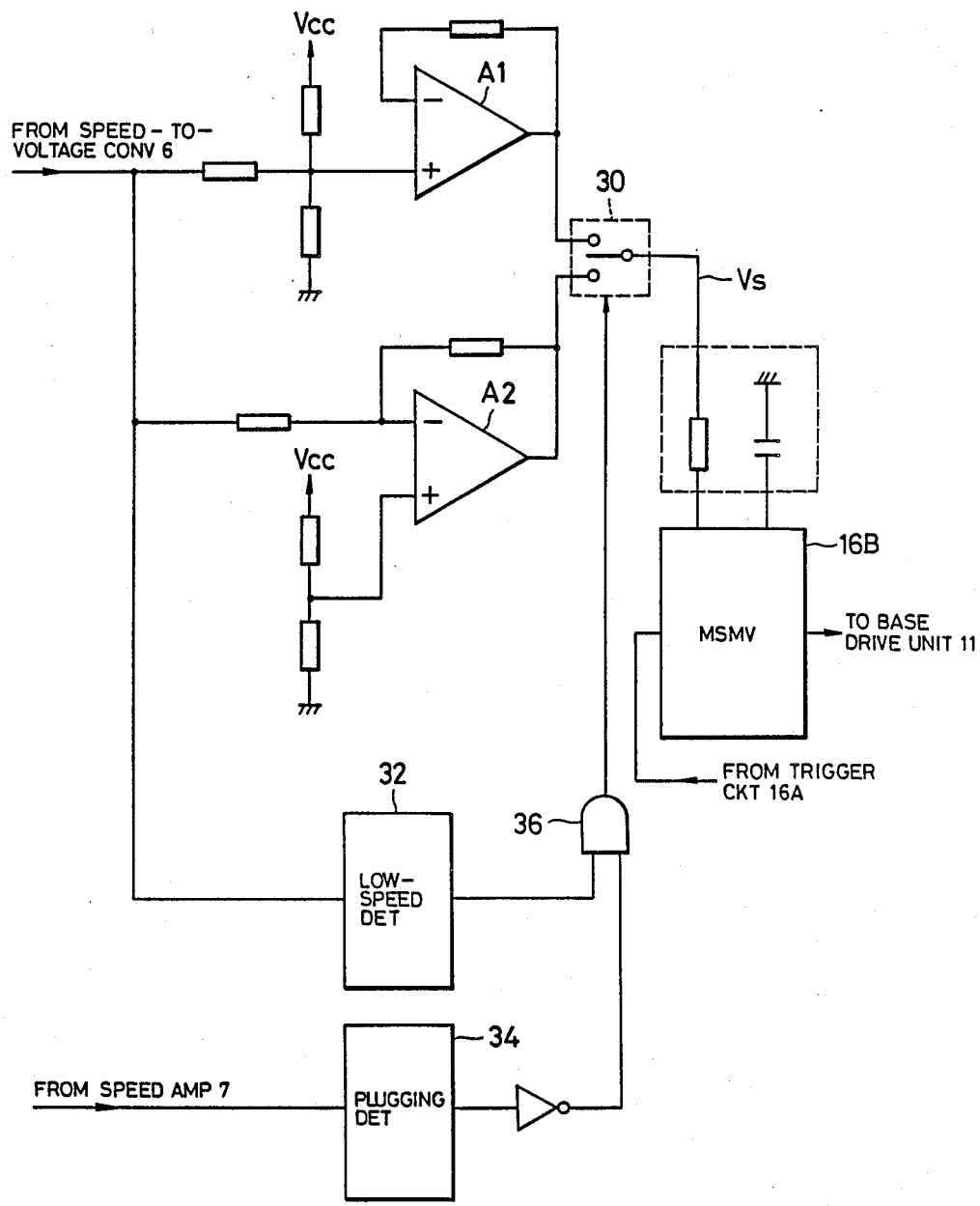
FIG. 11 is a diagram partially showing a fourth embodiment apparatus according to the present invention.

FIG. 11 shows a fourth embodiment apparatus according the present invention. Although the operating time duration of the monostable multivibrator(s) in the previous embodiments is assumed to be fixed, the time duration is made variable depending on the motor speed in this embodiment. The purpose of the fourth embodiment is to provide a relatively long operating time of the timer 16 when the motor speed is large during plugging, to shorten the same as the rotational speed lowers, and to further shorten the same as the rotational speed increases in a driving state.

Figure 12A:
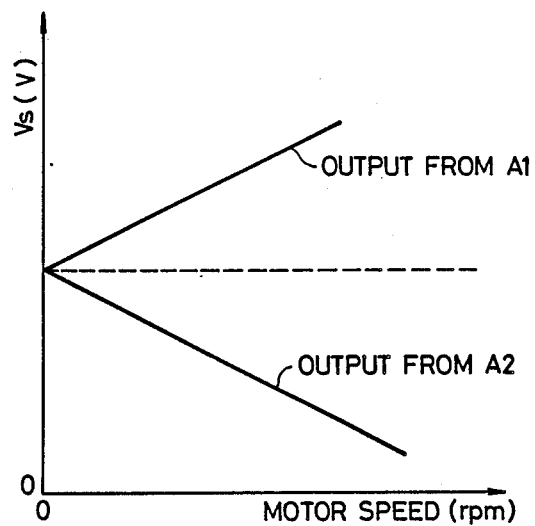
FIGS. 12A and 12B are diagrams for describing the operation of the fourth embodiment of FIG. 11.

To achieve such change in operating time of the monostable multivibrator 16B, a voltage applied via the resistor R to the monostable multivibrator 16B may be controlled. In the illustrated embodiment of FIG. 11, an operational amplifier A1 is responsive to the output signal from the speed-to-voltage converter 6 so that its output voltage increases as the motor speed increases. Another operational amplifier A2 which is also responsive to the output signal from the spee-to-voltage converter 6, operates so that its output voltage decreases as the motor speed increases. This state is shown in a graph of FIG. 12A.

The output signals from these two operational amplifiers A1 and A2 are selected by a switch 30 which is controlled by an output signal from an AND gate 36 responsive to output signals from a low-speed detector 32 and a plugging detector 34 which may be the same in construction as those in FIG. 10. More specifically, the output signal from the operational amplifier A1 is selected when the motor 3 is normally driven at a low speed, and the output signal from the other operational amplifier A2 is selected when the motor 3 is in plugging state.

As the operating time duration of the monostable multivibrator is controlled in accordance with the motor speed, the duration becomes longer when the motor speed is large in plugging, and as the speed reduces, the duration is also reduced. Furthermore, during normal driving state, the timer operating time duration is made long when the motor speed is low and becomes shorter as the speed rises.

Figure 12B:
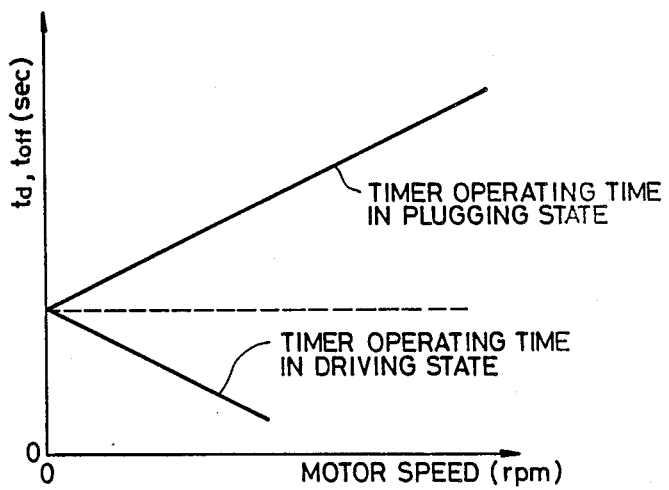

The dropping time of $i_w$ and rise time of $i_u$ in FIG. 9 vary in accordance with the induced voltage which is a function of the rotational speed. Therefore, when the rise time of $i_u$ is small as in plugging, the timer operating duration is made long and is then shortened as the rotational speed decreases so that unnecessary current reduction during timer operation is effectively prevented. This state is shown in FIG. 12B. As a result, undesirable torque reduction is avoided.

In the above embodiment, the invention has been described in connection with three-phase motor, but is not limited to such application. The above-described embodiments are just examples of the present invention, and therefore, it will be apparent for those skilled in the art that many modifications and variations may be made without departing from the scope of the present invention.

WHAT IS CLAIMED IS:

1. Apparatus for controlling the rotational speed of a synchronous motor comprising:
   (a) an inverter having switches for selectively energizing windings of a stator of said synchronous motor, and diodes connected to said switches in inverse parallel, said inverter being responsive to a dc power source;
   (b) a rotational speed sensing means for producing an output signal indicative of the rotational speed of said synchronous motor;
   (c) speed setting means responsive to said output signal from said rotational speed sensing means and to a signal indicative of a setting speed for producing a difference signal;
   (d) a pulse width modulation circuit responsive to said difference signal, said pulse width modulation circuit having a sawtooth wave generator and a comparator for outputting outputs through comparison of magnitude between the sawtooth wave from said sawtooth save generator and said difference signal;
   (e) a rotor position sensor for producing an output signal indicative of the position of the rotor of said synchronous motor;
   (f) a distribution circuit responsive to said output signal from said rotor position sensor and to an output signal from said pulse width modulation circuit for determining current distribution to said windings of said synchronous motor;
   (g) timer means responsive to an output signal from said distribution circuit for providing an output signal for a given period of time;
   (h) a drive circuit responsive to output signals from said distribution circuit and to an output from said timer means for selectively controlling said switches included in said inverter so that said switches are kept in off state for said given period of time determined by said timer means;
   (i) means responsive to said speed setting means for producing a plugging signal by detecting a sign of said difference signal; and
   (j) switching means response to said means for supplying said drive circuit with an output signal of said timer means when said motor is in plugging state.

2. Apparatus as claimed in claim 1, wherein said timer means is arranged to keep all of said switches, which are in on state, in off state for a predetermined period of time.

3. Apparatus as claimed in claim 1, wherein said timer means comprises a plurality of monostable multivibrators whose number equals the number of said switches.

4. Apparatus as claimed in claim 1, wherein said timer means comprises a trigger circuit responsive to a plurality of output signals from said distribution circuits, and a monostable multivibrators responsive to an output signal from said trigger circuit.

5. Apparatus for controlling the rotational speed of a synchronous motor comprising:
 (a) an inverter having switches for selectively energizing windings of the stator of said synchronous motor, and diodes connected to said switches in inverse parallel, said inverter being responsive to a dc power source;
 (b) a rotational speed sensing means for producing an output signal indicative of the rotational speed of said synchronous motor;
 (c) speed setting means responsive to said output signal from said rotational speed sensing means and to a signal indicative of a setting speed for producing a difference signal;
 (d) a pulse width modulation circuit responsive to said difference signal, said pulse width modulation circuit having a sawtooth wave generator and a comparator for outputting outputs through comparison of magnitude between the sawtooth wave from said sawtooth save generator and said difference signal;
 (e) a rotor position sensor for producing an output signal indicative of the position of the rotor of said synchronous motor;
 (f) a distribution circuit responsive to said output signal from said rotor position sensor and to an output signal from said pulse width modulation circuit for determining current distribution to said windings of said synchronous motor;
 (g) timer means responsive to an output signal from said distribution circuit for providing an output signal for a given period of time;
 (h) a drive circuit responsive to output signals from said distribution circuit and to an output signal from said timer means for selectively controlling said switches included in said inverter so that said switches are kept in off state for said given period of time determined by said timer means; and
 (i) means responsive to said rotational speed sensing means for varying an operating time duration of said timer means as a function of the rotational speed of said motor, having:
  (1) a first function generating circuit responsive to said output signal from rotational speed sensing means for producing an output signal which increases as the detected speed increases;
  (2) a second function generating circuit responsive to said output signal from rotational speed sensing means for producing an output signal which decreases as the detected speed increases;
  (3) switching means responsive to said rotational speed sensing means and to said speed setting means for selecting said output signals from said first and second function generation circuit; and
  (4) a circuit for supplying an output signal from said switching circuit to said timer 1 means.

* * * * *